US012570241B2

(12) United States Patent　　(10) Patent No.: US 12,570,241 B2
Weinman et al.　　(45) Date of Patent: Mar. 10, 2026

(54) VEHICLE WASHER FLUID RESERVOIR ASSEMBLY WITH A SUPPORT FOR A TUBE

(71) Applicant: Honda Motor Co., Ltd., Tokyo (JP)

(72) Inventors: Dakota E. Weinman, Dublin, OH
(US); Veronick Martinuzzi, Raymond,
OH (US); Timothy J. Rupp, Dublin,
OH (US); Babuji K. Tamarapoo,
Powell, OH (US); Hirofumi Takemoto,
Dublin, OH (US); **Patrick Lennon
Feiten**, Trussville, AL (US)

(73) Assignee: HONDA MOTOR CO., LTD., Tokyo
(JP)

( * ) Notice: Subject to any disclaimer, the term of this
patent is extended or adjusted under 35
U.S.C. 154(b) by 472 days.

(21) Appl. No.: 18/172,647

(22) Filed: Feb. 22, 2023

(65) Prior Publication Data

US 2024/0278749 A1　　Aug. 22, 2024

(51) Int. Cl.
*B60S 1/50*　　(2006.01)

(52) U.S. Cl.
CPC ...................................... *B60S 1/50* (2013.01)

(58) Field of Classification Search
CPC .... B60S 1/50; F16B 3/13; F16B 3/222; F16L
3/1222
USPC ...... 220/562, 746, 913; 239/284.1; 280/830;
248/75
See application file for complete search history.

(56) References Cited

U.S. PATENT DOCUMENTS

| | | | | |
|---|---|---|---|---|
| 5,000,333 | A * | 3/1991 | Petrelli ...................... | B60S 1/50 239/284.1 |
| 5,024,383 | A * | 6/1991 | Vaschetto .............. | B62D 25/12 296/193.11 |
| 6,044,517 | A * | 4/2000 | Zendler ..................... | B60S 1/50 239/284.1 |
| 7,216,818 | B2 * | 5/2007 | Lee ....................... | B62D 25/025 239/284.1 |
| 8,403,366 | B2 | 3/2013 | Mtsuura et al. | |
| 8,544,891 | B2 * | 10/2013 | Kitagawa .................. | B60S 1/50 239/284.1 |
| 2013/0175424 | A1 * | 7/2013 | Shimada ................ | F16M 13/02 248/634 |
| 2018/0216587 | A1 * | 8/2018 | Morimoto ............... | F16L 25/10 |

FOREIGN PATENT DOCUMENTS

| | | | | |
|---|---|---|---|---|
| CN | 203713823 | U | 7/2014 | |
| DE | 102011118929 | A1 * | 5/2013 | ............... B60S 1/50 |
| EP | 2019007 | A1 * | 1/2009 | .......... B60Q 1/0017 |
| JP | 3560851 | B2 | 9/2004 | |
| JP | 2005335624 | A | 12/2005 | |
| JP | 4823724 | B2 | 11/2011 | |
| JP | 2015077945 | A * | 4/2015 | |
| JP | 2015123770 | A2 | 7/2015 | |

(Continued)

OTHER PUBLICATIONS

JP2015-77945 to Saito, English translation (Year: 2015).*
DE102011118929 to Koll, English translation. (Year: 2013).*

*Primary Examiner* — Anne Marie M Boehler
(74) *Attorney, Agent, or Firm* — Plumsea Law Group,
LLC

(57) ABSTRACT
A washer fluid reservoir assembly for a vehicle may include
a washer fluid reservoir, a support assembly including a
bracket extending from the washer fluid reservoir, and a clip
connected to the bracket, and a tube extending from the
washer fluid reservoir and through the clip.

16 Claims, 5 Drawing Sheets

(56)                    References Cited

FOREIGN PATENT DOCUMENTS

| JP | 5847149 | B2 | | 1/2016 | |
|----|---------|----|---|--------|--|
| KR | 20030033166 | A | * | 5/2003 | ............... B60S 1/46 |
| KR | 101520875 | B1 | | 5/2015 | |
| KR | 101534736 | B1 | | 7/2015 | |

* cited by examiner

VEHICLE WASHER FLUID RESERVOIR ASSEMBLY WITH A SUPPORT FOR A TUBE

BACKGROUND

1. Field of the Disclosure

The present disclosure relates to a washer fluid reservoir assembly for a vehicle, and more particularly to vehicle washer fluid assembly with a support for a tube.

2. Description of Related Art

Motor vehicles often have washer fluid reservoirs for holding a supply of a liquid, such as water, or a water-methanol solution. The liquid can be sprayed onto a surface to clean the surface. For example, a vehicle may include a pump configured to draw the liquid from the washer fluid reservoir and spray a windshield, a rear-window, or headlight with the liquid through a washer nozzle.

The washer fluid reservoir may be located in any of a number of areas within a vehicle. The washer fluid reservoir is typically disposed in an area with convenient access for refilling the liquid in the washer fluid reservoir. However, the washer fluid reservoir may also need to be disposed away from electrical components of the vehicle, such as a battery, and away for sources of heat, such as an engine block or exhaust manifold. In some applications, the washer fluid reservoir may be disposed between a wheel arch and a fender. Installation of the washer fluid reservoir may be difficult due to placement considerations such as those described herein.

There is a need in the art for a washer fluid reservoir having a support for a tube.

SUMMARY OF THE INVENTION

The present disclosure is directed to improvements in a vehicle washer reservoir. In one aspect, a washer fluid reservoir assembly for a vehicle may include a washer fluid reservoir, a support assembly including a bracket extending from the washer fluid reservoir, and a clip connected to the bracket, and a tube extending from the washer fluid reservoir and through the clip.

In one aspect, the bracket may be a mold-in component of the washer fluid reservoir.

In one aspect, the bracket may include a mounting point.

In one aspect, the mounting point may be one of a hole and a notch.

In one aspect, the clip may include a fastener connected to the mounting point, and a retainer connected to the tube.

In one aspect, the fastener may be press fit in the mounting point.

In one aspect, the clip may be configured to maintain an orientation of the tube.

In one aspect, the tube extending from the washer fluid reservoir and through the clip may have an upright configuration.

In one aspect, the washer fluid reservoir assembly may be installed between a body of the vehicle and an interior structure of the vehicle, wherein the tube extends over the interior structure.

In one aspect, the tube may be connected to a hose assembly of the vehicle.

In one aspect, a washer fluid reservoir assembly for a vehicle may include a washer fluid reservoir, a support assembly extending from the washer fluid reservoir, and a tube extending from the washer fluid reservoir and having an upright configuration maintained by the support assembly.

In one aspect, the support assembly may include a bracket extending from the washer fluid reservoir, and a clip connected to the bracket.

In one aspect, the bracket may include a mounting point configured to receive the clip.

In one aspect, the mounting point may be one of a hole and a notch.

In one aspect, the clip may include a fastener connected to the bracket, and a retainer connected to the tube.

In one aspect, the fastener may be press fit in the bracket.

In one aspect, the support assembly may be configured to maintain the upright configuration of the tube.

In one aspect, the washer fluid reservoir assembly may be installed between a body of the vehicle and an interior structure of the vehicle, wherein the tube extends over the interior structure.

In one aspect, the tube may be connected to a hose assembly of the vehicle.

In one aspect, the tube may be a breathing tube.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
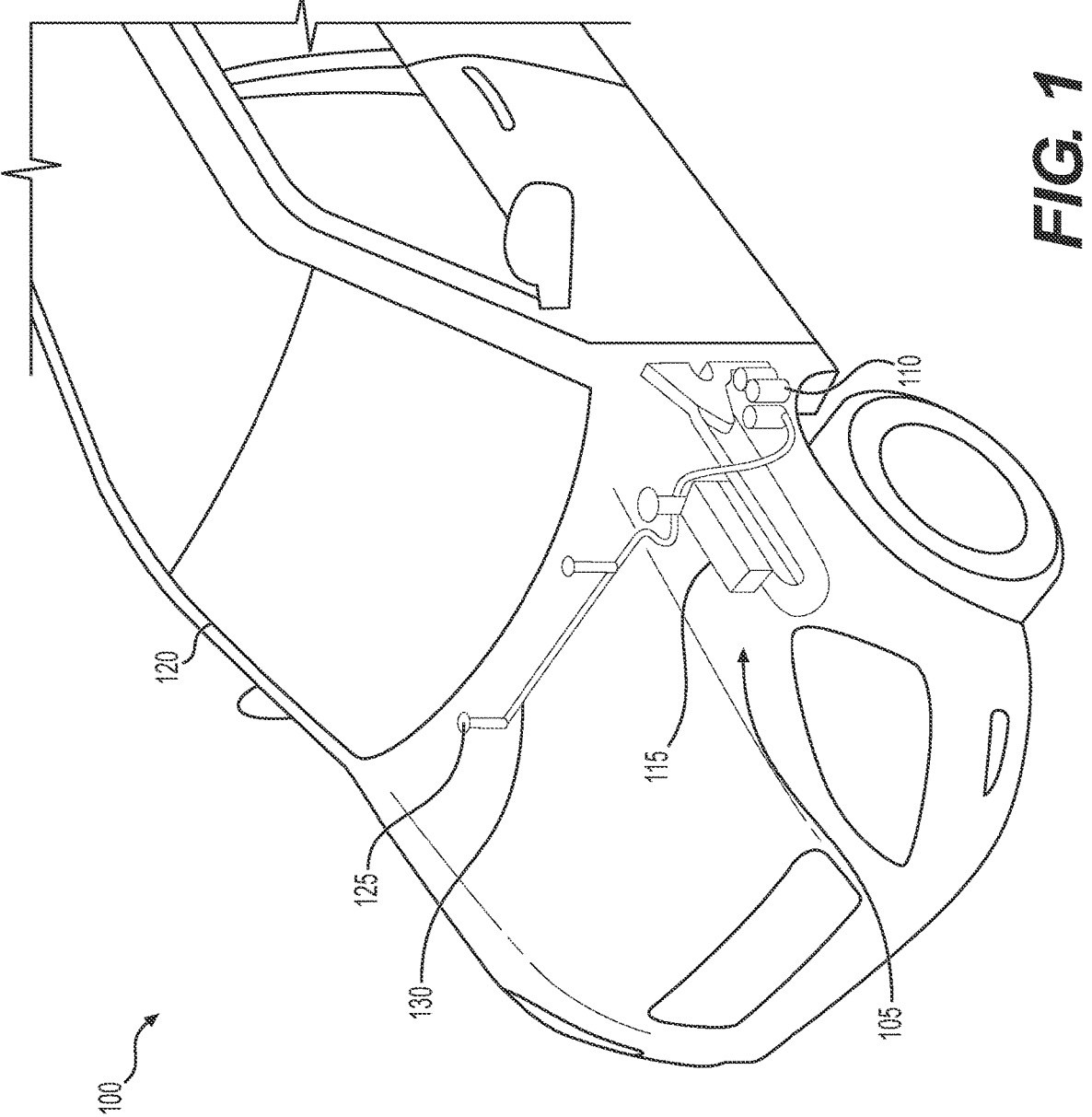
FIG. 1 illustrates an embodiment of a vehicle having a washer fluid reservoir assembly according to some embodiments.

There is a need in the art for an improved washer fluid reservoir. FIG. 1 illustrates an embodiment of a vehicle 100 having a washer fluid reservoir assembly 105 according to some embodiments. The washer fluid reservoir assembly 105 may be located in the vehicle 100. The washer fluid reservoir assembly 105 may be located, for example, between a fender and a wheel well liner, behind a bumper cover, or in front of a firewall bulkhead. The washer fluid reservoir assembly 105 may be associated with a pump 110 configured to draw the liquid from a washer fluid reservoir 115 of the washer fluid reservoir assembly 105 and spray a windshield 120 with the liquid through a washer nozzle 125. The pump 110 may be configured to draw the liquid from the washer fluid reservoir and spray a windshield, a rear-window, a camera, or a headlight with the liquid through a washer nozzle 125. The washer nozzle 125 may be connected to the pump 110 by a hose assembly 130.

According to some aspects, the washer fluid reservoir assembly 105 may include a tube to be routed within the vehicle 100 while the washer fluid reservoir assembly 105 is moved into an installed position. In some aspects the tube may carry a washer fluid from the pump 110 to the hose assembly 130. In some aspects, the tube may be a breathing tube, which may prevent a build-up of pressure in the washer fluid reservoir 115.

In some examples, the washer fluid reservoir assembly 105 may include a support for the tube, which may maintain an orientation of the tube during the installation of the washer fluid reservoir assembly 105. Following installation of the washer fluid reservoir assembly 105, the tube may be connected to the hose assembly 130, for example.

Figure 2:
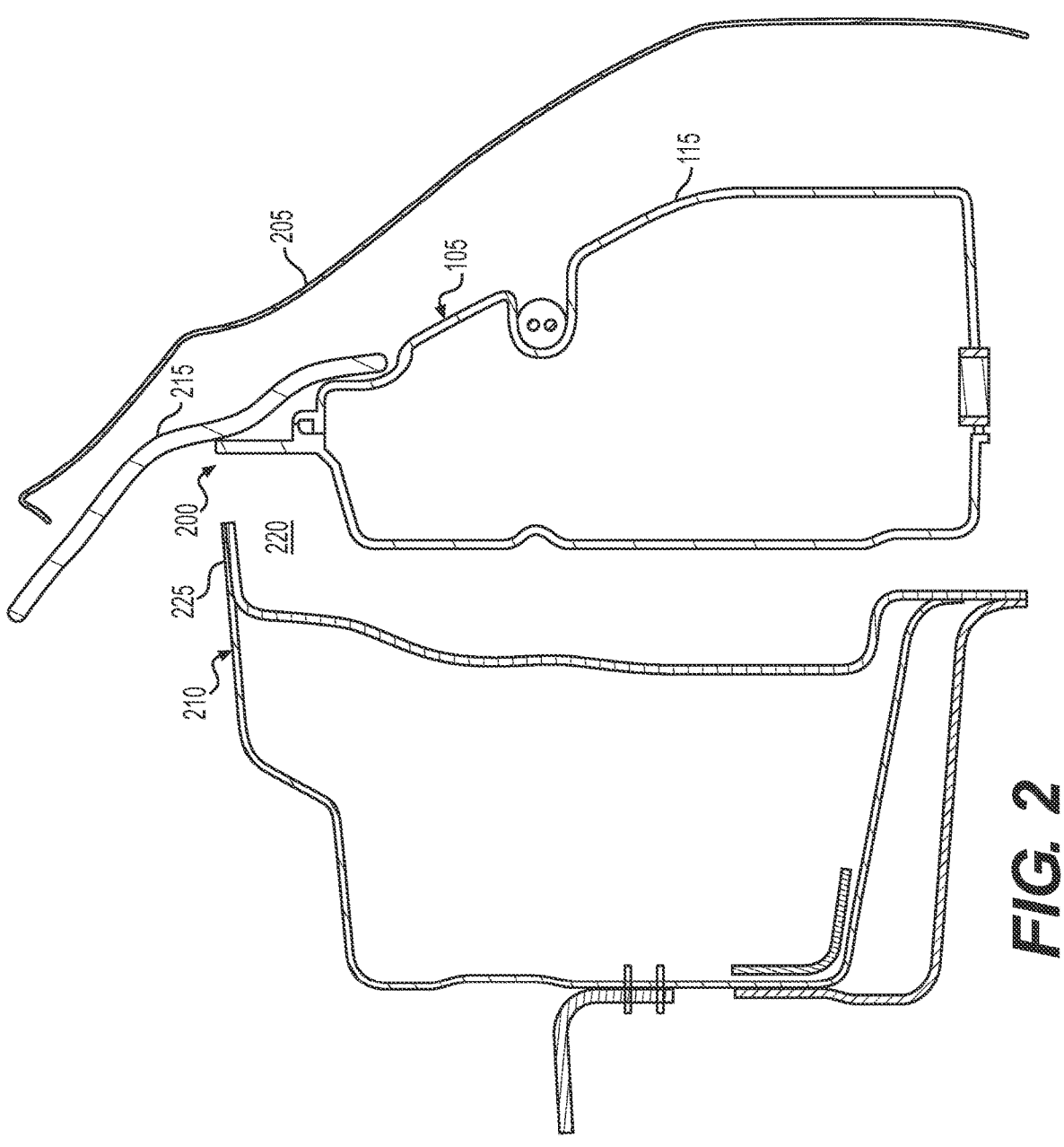
FIG. 2 illustrates an embodiment of a washer fluid reservoir assembly having a support assembly according to some embodiments.

FIG. 2 illustrates an embodiment of a washer fluid reservoir assembly 105 having a support assembly 200 according to some embodiments. According to some embodiments, a process of installing the washer fluid reservoir assembly 105 may include guiding the washer fluid reservoir assembly 105 between a body 205 of the vehicle and an interior structure 210. The interior structure 210 may be, for example, a fender, a wheel well liner, a ladder frame, a unibody frame, or a firewall bulkhead.

In some aspects, the washer fluid reservoir assembly 105 may include a tube 215 extending upwards from the washer fluid reservoir assembly 105. In some embodiments, the tube 215 may be attached to the pump 110 at a base of the washer fluid reservoir 115. For example, the tube 215 may be attached to an outlet or hose barb of the pump 110.

According to some embodiments, the tube 215 may be plastic, rubber, or vinyl tubing, for example. In some aspects, when the washer fluid reservoir assembly 105 is in an installed position, the tube 215 may extend between the body 205 of the vehicle and the interior structure 210. Following the installation of the washer fluid reservoir assembly 105, the tube 215 may be bent over the interior structure 210, secured in place and connected to the hose assembly 130. The pump 110 may draw washer fluid in directly from the washer fluid reservoir 115 and provide the washer fluid to the hose assembly 130 via the tube 215.

In some aspects, the support assembly 200 may be configured to support the tube 215 in an upright configuration. The upright configuration of the tube 215, supported by the support assembly 200, may enable the tube 215 to be guided between the between the body 205 of the vehicle and the interior structure 210 as illustrated in FIG. 2. In some aspects, the upright configuration of the tube 215, supported by the support assembly 200, may enable the tube 215 to be guided between the between the body 205 of the vehicle and the interior structure 210 without being impinged between the washer fluid reservoir assembly 105 and the interior structure 210, for example, at an intermediate area 220. For example, the upright configuration of the tube 215, as supported by the support assembly 200, may prevent the tube 215 from being tucked under the interior structure 210.

In some examples, the upright configuration may be within about 0 to 50 degrees from the vertical. In other examples, the upright configuration may be within about 0 to 30 degrees from the vertical. That is, the upright configuration of the tube 215, as supported by the support assembly 200, may be an angle that may prevent the tube 215 from being tucked under the interior structure 210 and impinged in the intermediate area 220.

As described, in some embodiments, the support assembly 200 may direct the tube 215 up and away from the interior structure 210. In some aspects, the tube 215 may have a length and a flexibility (or stiffness) that prevents the tube 215 from bending over under its own weight in a manner that may allow the tube 215 to be impinged between the washer fluid reservoir assembly 105 and the interior structure 210. In some aspects, the tube 215 may have a length sufficient to extend over the interior structure 210. Therefore, a line assembly worker assembling the vehicle 100 may have access to the tube 215 when the washer fluid reservoir assembly 105 is installed between the body 205 of the vehicle and the interior structure 210. In an example in which the support assembly 200 is not provided and a tube becomes impinged between the washer fluid reservoir assembly 105 and the interior structure 210, the washer fluid reservoir assembly 105 may need to be removed to gain access to the tube.

Figure 3:
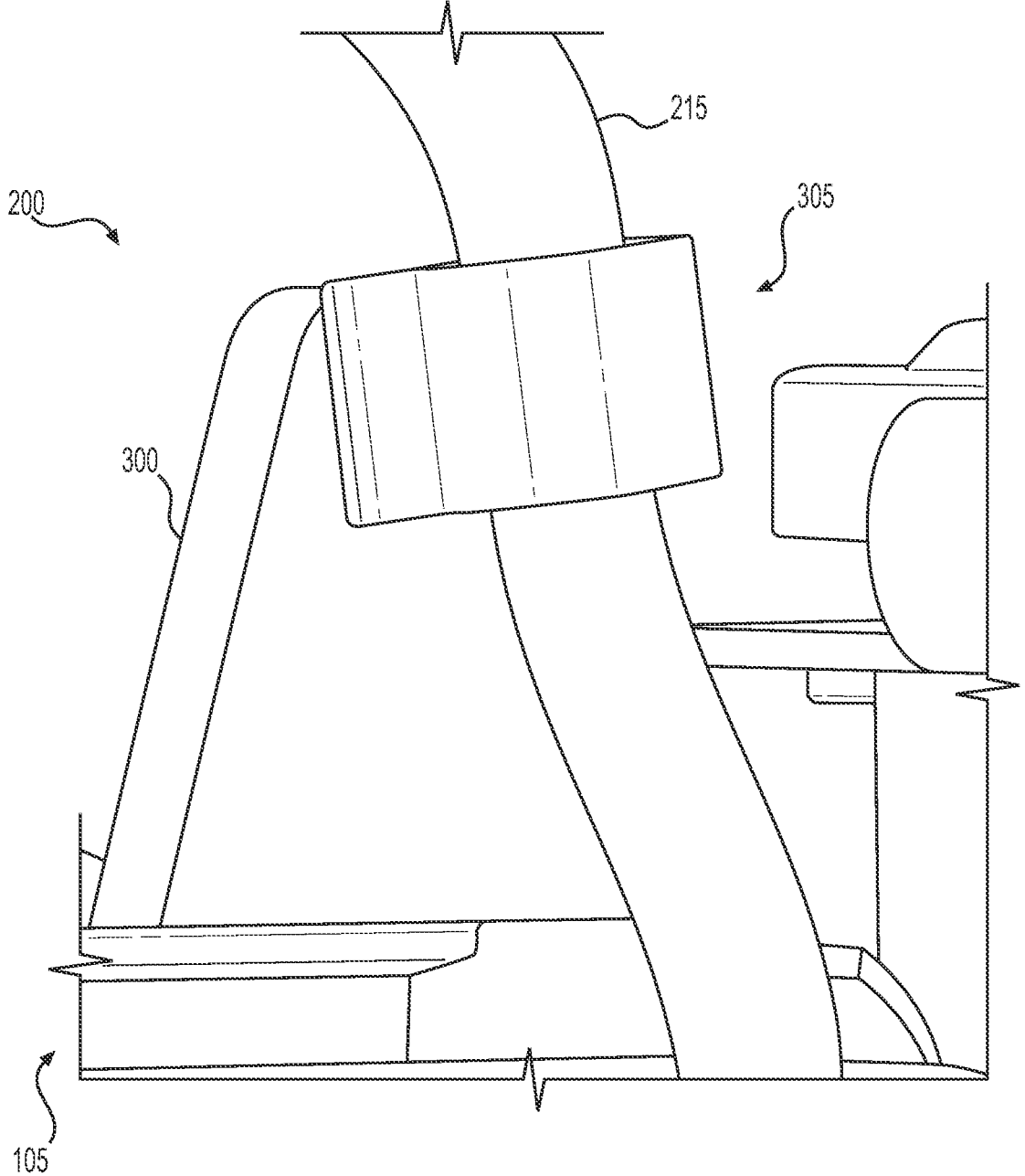
FIG. 3 illustrates an embodiment of a support assembly according to some embodiments.

FIG. 3 illustrates an embodiment of the support assembly 200 according to some embodiments. In some aspects, the support assembly 200 may include a bracket 300 and a clip 305. The bracket 300 may be a mold-in component of the washer fluid reservoir assembly 105. In some aspects, the bracket 300 may be a separate component of the washer fluid reservoir assembly 105, and connected to the washer fluid reservoir assembly 105. In some aspects, the bracket 300 includes a mounting point 400 (see FIG. 4) for receiving the clip 305. For example, the mounting point 400 may be a hole or a notch in the bracket 300.

Figure 4:
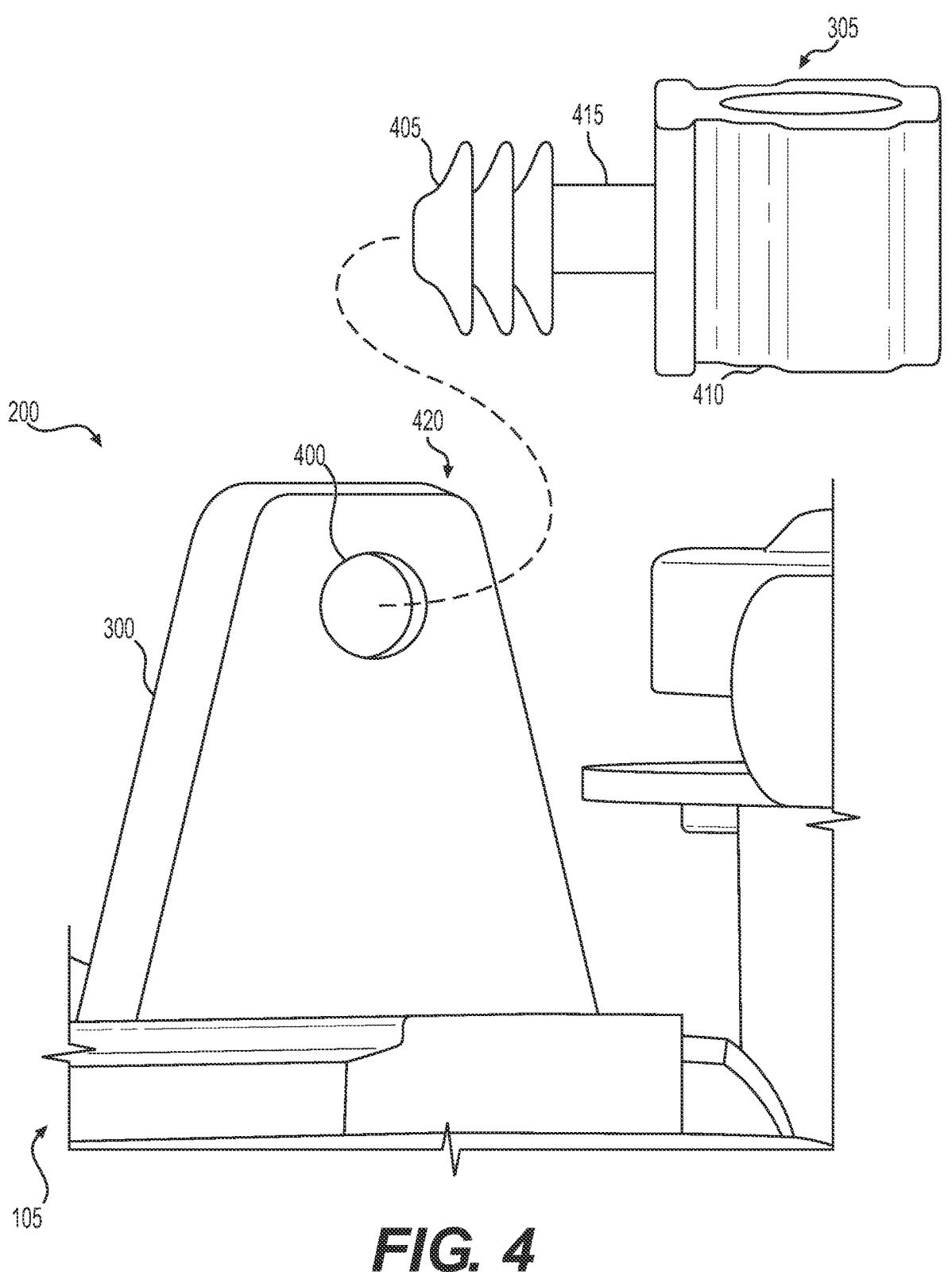
FIG. 4 illustrates an embodiment of a bracket and a clip of a support assembly according to some embodiments.

FIG. 4 illustrates an embodiment of the bracket 300 and the clip 305 of the support assembly 200 according to some embodiments. In some aspects, the bracket 300 extends from the washer fluid reservoir assembly 105. In some aspects, a height of the bracket 300 may be, for example, above an upper surface 225 of the interior structure 210 when the washer fluid reservoir assembly 105 is in an installed position (for example, see FIG. 2). The bracket 300 is illustrated having a tapered shape, including an upper portion 420, which may be relatively narrow, and a base portion, which may be relatively wide. The bracket 300 may have any shape. For example, the bracket 300 may be rectangular in shape.

The bracket 300 may include the mounting point 400 configured to receive the clip 305. The mounting point 400 may be a hole in the bracket 300, or a notch in an upper portion 420 of the bracket 300. The mounting point 400 may have any shape configured to receive a portion of the clip 305.

The mounting point 400 may have a height sufficient to direct the tube 215 in an upward direction (see for example, FIG. 2). The height of the mounting point 400 may be, for example, a height above the washer fluid reservoir 115. More particularly, the mounting point 400 may have a height sufficient, in combination with a length and a flexibility of the tube 215, to direct the tube 215 in an upward direction.

In some aspects, the clip 305 may include a fastener 405 configured to secure the clip 305 to the bracket 300. The fastener 405 may be, for example, a rivet fastener, a push-in mount, a canoe push fit mount, or a push clip. The fastener 405 of the clip 305 may be press fit into the mounting point 400. In at least one embodiment, the fastener 405 of the clip 305 may include a plurality of concentric fins, which may secure the fastener 405 of the clip 305 in the mounting point 400. In some aspects, the fastener 405 of the clip 305 may be screwed into the mounting point 400.

In some aspects, the clip 305 includes a retainer 410 configured to receive the tube 215. The retainer 410 may be a clasp, a split retainer, a clip, a cable tie, or a ring, for example, for receiving the tube 215. For example, the retainer 410 may include a portion configured to retain the tube 215 passed through or pressed into the retainer 410. In some aspect, the retainer 410 may be circular in shape or semi-circular in shape. The retainer 410 may have any shape configured to retain the tube 215.

The clip 305 may further include a middle portion 415, connecting the fastener 405 and the retainer 410. For example, the middle portion 415 may have a diameter and shape configured to fit in the mounting point 400 when the fastener 405 is pushed through the mounting point 400. In some examples, the fastener 405 is configured to be pressed through the mounting point 400 and resist or prevent removal of the clip 305 from the mounting point 400.

Figure 5:
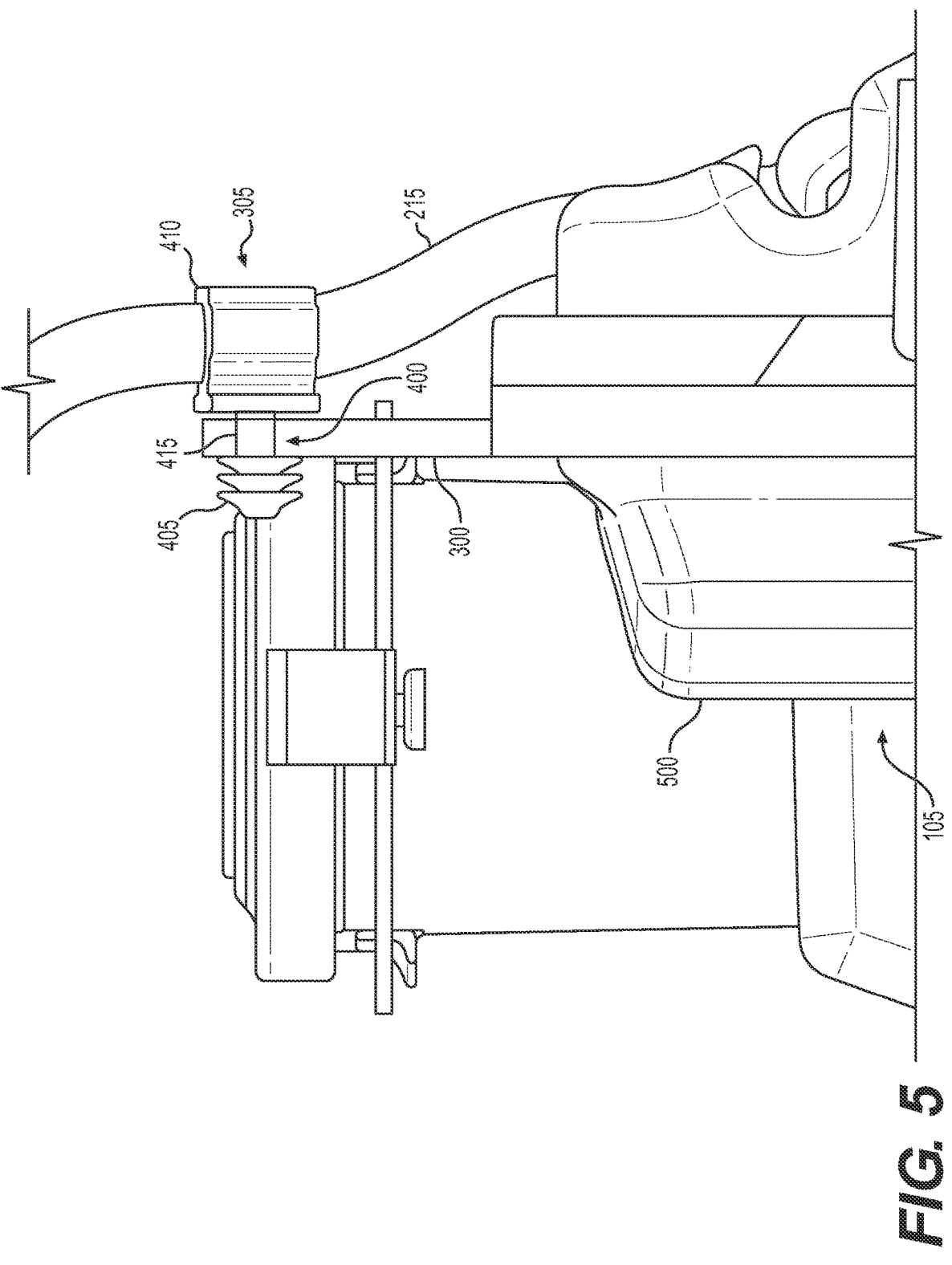
FIG. 5 illustrates an embodiment of a washer fluid reservoir assembly according to some embodiments.

Referring to FIG. 3, FIG. 4, and FIG. 5, in some embodiments the clip 305 may be secured to the mounting point 400 of the bracket 300. For example, the clip 305 may include the fastener 405 securing the clip 305 to the bracket 300. In some aspects, the clip 305 includes the retainer 410 configured to receive the tube 215 and to direct the tube 215 upwards.

FIG. 5 illustrates an embodiment of the bracket 300 according to some embodiments. According to some embodiments, the bracket 300 may extend upwards from a reservoir body 500 of the washer fluid reservoir assembly 105. In some embodiments, the clip 305 may be secured to the bracket 300. For example, the clip 305 may include the fastener 405 securing the clip 305 to the bracket 300. In some aspects, the fastener 405 may pass through the mounting point 400. In some aspects, the clip 305 includes the retainer 410 configured to receive the tube 215. For example, the retainer 410 directs the tube 215 up and away from the interior structure 210, for example, an inner fender. In some aspects, the mounting point 400 may be an opening for receiving the fastener 405 of the clip 305. For example, the mounting point 400 may be a hole or a notch in the bracket 300.

In some aspects, the mounting point 400 of the clip 305 receives the tube 215. For example, the mounting point 400 of the clip 305 may be a collar through which the tube 215 may be passed. In some embodiments, the tube 215 may be attached to the reservoir body 500. For example, an end of the tube 215 may be attached to the pump 110, which may be connected to the reservoir body 500. In some embodiments, the tube 215 may be attached to the reservoir body 500 in an upright configuration, and may pass through the mounting point 400 of the clip 305. For example, even in a case where the clip 305 may rotate in the bracket 300, the upright configuration of the tube 215, in combination with the clip 305, may cooperate to maintain a distal end of the tube 215 in the upright configuration. For example, the tube 215 may have a length and a flexibility (or stiffness) that permits the upright configuration for guiding the tube 215 between the body 205 of the vehicle and the interior structure 210 without being impinged between the washer fluid reservoir assembly 105 and the interior structure 210.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

We claim:

1. A washer fluid reservoir assembly for a vehicle comprising:
   a washer fluid reservoir;
   a support assembly comprising:
      a bracket including a straight flange oriented substantially vertically and extending from a top surface of the washer fluid reservoir; and
      a clip connected to the bracket; and
   a tube extending from the washer fluid reservoir and through the clip;
   wherein the bracket comprises a mounting point;
   wherein the clip comprises:
      a fastener connected to the mounting point; and
      a retainer connected to the tube;
      the retainer including a substantially cylindrical receptacle having a straight configuration oriented substantially vertically.

2. The washer fluid reservoir assembly of claim 1, wherein the bracket is a mold-in component of the washer fluid reservoir.

3. The washer fluid reservoir assembly of claim 1, wherein the mounting point is one of a hole and a notch.

4. The washer fluid reservoir assembly of claim 1, wherein the fastener is press fit in the mounting point.

5. The washer fluid reservoir assembly of claim 1, wherein the clip is configured to maintain an orientation of the tube.

6. The washer fluid reservoir assembly of claim 1, wherein the tube extending from the washer fluid reservoir and through the clip has an upright configuration.

7. The washer fluid reservoir assembly of claim 1, installed between a body of the vehicle and an interior structure of the vehicle, wherein the tube extends over the interior structure.

8. The washer fluid reservoir assembly of claim 1, wherein the tube is connected to a hose assembly of the vehicle.

9. A washer fluid reservoir assembly for a vehicle comprising:
   a washer fluid reservoir;
   a support assembly comprising:
      a bracket including a straight flange oriented substantially vertically and extending from a top surface of the washer fluid reservoir; and
      a clip connected to the bracket, the clip including a fastener and a retainer having a substantially cylindrical receptacle with a straight configuration oriented substantially vertically; and
   a tube received by the receptacle of the clip, extending from the washer fluid reservoir, and having an upright configuration maintained by the support assembly.

10. The washer fluid reservoir assembly of claim 9, wherein the bracket comprises a mounting point configured to receive the clip.

11. The washer fluid reservoir assembly of claim 10, wherein the mounting point is one of a hole and a notch.

12. The washer fluid reservoir assembly of claim 9, wherein the clip comprises a fastener connected to the bracket.

13. The washer fluid reservoir assembly of claim 12, wherein the fastener is press fit in the bracket.

14. The washer fluid reservoir assembly of claim 9, installed between a body of the vehicle and an interior structure of the vehicle, wherein the tube extends over the interior structure.

15. The washer fluid reservoir assembly of claim 9, wherein the tube is connected to a hose assembly of the vehicle.

16. The washer fluid reservoir assembly of claim 9, wherein the tube is a breathing tube.

\* \* \* \* \*